(12) United States Patent
Sasakawa

(10) Patent No.: US 11,680,136 B2
(45) Date of Patent: Jun. 20, 2023

(54) RESIN COMPOSITION AND MOLDED ARTICLE

(71) Applicant: TBM CO., LTD., Tokyo (JP)

(72) Inventor: Gouki Sasakawa, Tokyo (JP)

(73) Assignee: TBM CO., LTD., Tokyo (JP)

( * ) Notice: Subject to any disclaimer, the term of this patent is extended or adjusted under 35 U.S.C. 154(b) by 53 days.

(21) Appl. No.: 17/641,305

(22) PCT Filed: Sep. 21, 2021

(86) PCT No.: PCT/JP2021/034587
§ 371 (c)(1),
(2) Date: Mar. 8, 2022

(87) PCT Pub. No.: WO2022/039282
PCT Pub. Date: Feb. 24, 2022

(65) Prior Publication Data
US 2022/0325039 A1 Oct. 13, 2022

(30) Foreign Application Priority Data
Mar. 25, 2021 (JP) .................................. 2021-052122

(51) Int. Cl.
*C08G 63/183* (2006.01)
*C08K 3/26* (2006.01)
*C08K 5/11* (2006.01)

(52) U.S. Cl.
CPC .............. *C08G 63/183* (2013.01); *C08K 3/26* (2013.01); *C08K 5/11* (2013.01); *C08G 2230/00* (2013.01); *C08K 2003/265* (2013.01)

(58) Field of Classification Search
CPC .... C08G 63/183; C08G 2230/00; C08K 5/11; C08K 2003/265; C08K 3/26
USPC ........................................................ 524/425
See application file for complete search history.

(56) References Cited

U.S. PATENT DOCUMENTS

| | | |
|---|---|---|
| 2009/0324917 A1 | 12/2009 | Wang et al. |
| 2013/0316106 A1 | 11/2013 | Nakano et al. |
| 2016/0145413 A1* | 5/2016 | Patel ................ C08L 23/06 264/328.17 |
| 2017/0037241 A1 | 2/2017 | Schmidt et al. |
| 2018/0298187 A1 | 10/2018 | Lu et al. |
| 2020/0199354 A1 | 6/2020 | Dalibey et al. |
| 2021/0238383 A1 | 8/2021 | Terada |
| 2021/0284836 A1 | 9/2021 | Aloui Dalibey et al. |

FOREIGN PATENT DOCUMENTS

| | | | |
|---|---|---|---|
| CN | 112063133 A | | 12/2020 |
| JP | 2003041142 A | * | 2/2003 |
| JP | 2013179881 A | | 9/2013 |
| JP | 2016106171 A | | 6/2016 |
| JP | 2017505837 A | | 2/2017 |
| JP | 2017119850 A | | 7/2017 |
| JP | 2018527416 A | | 9/2018 |
| JP | 2020063430 A | | 4/2020 |
| JP | 2020066721 A | | 4/2020 |
| KR | 2014106882 A | * | 9/2014 |
| KR | 101823409 B1 | | 1/2018 |
| WO | 2020008029 A1 | | 1/2020 |
| WO | 2020111072 A1 | | 6/2020 |
| WO | WO-2020201094 A1 * | 10/2020 | ........... B65D 65/466 |
| WO | WO-2020208245 A1 * | 10/2020 | ............. B29B 7/603 |

OTHER PUBLICATIONS

JP 2003-041142 A, machine translation, EPO espacenet. (Year: 2003).*
KR 2014-0106882 A., machine translation, InnovationQ Plus (IP.com). (Year: 2014).*
WO 2020/0201094 A1, machine translation, InnovationQ Plus (IP.com). (Year: 2020).*
WO 2020/0208245 A1, machine translation, WIPO Patentscope. (Year: 2020).*
Database WPI / 2017 Clarivate Analytics; Week 201812 Thomson Scientific, London, GB; AN2018-11192T XP002807055.
Database WPI / 2017 Clarivate Analytics; Week 202101 Thomson Scientific, London, GB; AN 2020-C6420T XP002807054.
International Search Report for International Application No. PCT/JP2021/034587; dated Nov. 30, 2021.

* cited by examiner

*Primary Examiner* — Ling Siu Choi
*Assistant Examiner* — Ronald Grinsted
(74) *Attorney, Agent, or Firm* — Cantor Colburn LLP

(57) ABSTRACT

The present invention may provide a composition containing a biologically degradable resin from which a molded article having suppressed deterioration of the tensile strength and the elongation at the breaking point thereof can be obtained. The present invention may provide a resin composition including a biologically degradable resin, a heavy calcium carbonate, and acetyl tributyl citrate, in which a mass ratio of the biologically degradable rein to the heavy calcium carbonate is 10:90 to 70:30, the biologically degradable resin includes at least polybutylene adipate terephthalate or polybutylene succinate adipate, a content of the polybutylene adipate terephthalate or the polybutylene succinate adipate relative to the biologically degradable resin is 70% or more by mass, and a content of the acetyl tributyl citrate relative to the resin composition is 5.0% or more and 20.0% or less by mass.

8 Claims, No Drawings

RESIN COMPOSITION AND MOLDED ARTICLE

CROSS REFERENCE TO RELATED APPLICATIONS

This is the U.S. national stage of application No. PCT/JP2021/034587, filed on Sep. 21, 2021. Priority under 35 U.S.C. § 119(a) and 35 U.S.C. § 365(b) is claimed from Japanese Application No. 2021-052122, filed Mar. 25, 2021, the disclosure of which is also incorporated herein by reference.

FIELD

The present invention relates to a resin composition and a molded article.

BACKGROUND

A biologically degradable resin has been receiving an attention as a resin that is environmentally friendly because it is degradable to a substance that is inherently present in nature by action of a microorganism or by hydrolysis.

It has been proposed to blend various components to the biologically degradable resin in order to impart good properties thereto without impairing the small environmental load thereof (for example, Patent Literature 1 and Patent Literature 2). Illustrative examples of the component like this include calcium carbonate.

CITATION LIST

Patent Literature

Patent Literature 1: Japanese Patent Application Laid-open No. 2017-119850
Patent Literature 2: Japanese Translation of PCT Application Laid-open No. 2018-527416

SUMMARY

Technical Problem

However, there is a possibility that in the biologically degradable resin composition that is blended with a large amount of calcium carbonate, mechanical strengths of the molded article obtained by molding the composition decrease.

The inventor of the present invention has found that in the biologically degradable resin composition like this, among the mechanical strengths, especially a tensile strength and an elongation at the breaking point are prone to be deteriorated.

The present invention has been made in view of the circumstances described above; and an object thereof is to provide a composition containing a biologically degradable resin from which a molded article having suppressed deterioration of the tensile strength and the elongation at the breaking point thereof can be obtained.

Solution to Problem

The inventor of the present invention has found that the problem described above can be solved by combining a biologically degradable resin containing at lease polybutylene adipate terephthalate or polybutylene succinate adipate with a heavy calcium carbonate, which has led to completion of the present invention. More specifically, the present invention provides the following aspects.

(1) A resin composition including a biologically degradable resin and a heavy calcium carbonate, in which
a mass ratio of the biologically degradable resin to the heavy calcium carbonate is in the range of 10:90 to 70:30, and
the biologically degradable resin includes at least polybutylene adipate terephthalate or polybutylene succinate adipate.

(2) The resin composition according to (1), in which
the biologically degradable resin is composed of polybutylene adipate terephthalate and polylactic acid, and
a mass ratio of the polybutylene adipate terephthalate to the polylactic acid is in the range of 50:50 to 90:10.

(3) The resin composition according to (1), in which
the biologically degradable resin is composed of polybutylene succinate adipate and polylactic acid, and
a mass ratio of the polybutylene succinate adipate to the polylactic acid is in the range of 50:50 to 90:10.

(4) The resin composition according to any one of (1) to (3), in which
the resin composition further includes acetyl tributyl citrate of 5.0% or more and 20.0% or less by mass, relative to the composition.

(5) The resin composition according to any one of (1) to (4), in which
the resin composition further includes a natural organic substance of 3.0% or more and 25.0% or less by mass, relative to the composition, and
the natural organic substance is one or more substances selected from the group consisting of cellulose powder, wooden powder, starch, rice husk, soy pulp, and bran.

(6) The resin composition according to any one of (1) to (5), in which an average particle diameter of the heavy calcium carbonate is 0.7 μm or more and 6.0 μm or less.

(7) A molded article obtained from the resin composition according to any one of (1) to (6).

(8) The molded article according to (7), in which the molded article is an inflation-molded article.

(9) The molded article according to (7), in which the molded article is an extrusion-molded article.

(10) A resin composition including a biologically degradable resin, a heavy calcium carbonate, and acetyl tributyl citrate, in which
a mass ratio of the biologically degradable rein to the heavy calcium carbonate is 10:90 to 70:30,
the biologically degradable resin includes at least polybutylene adipate terephthalate or polybutylene succinate adipate,
a content of the polybutylene adipate terephthalate or the polybutylene succinate adipate relative to the biologically degradable resin is 70% or more by mass, and
a content of the acetyl tributyl citrate relative to the resin composition is 5.0% or more and 20.0% or less by mass.

(11) The resin composition according to (10), in which the biologically degradable resin is composed of polybutylene adipate terephthalate and polylactic acid.

(12) The resin composition according to (10), in which the biologically degradable resin is composed of polybutylene succinate adipate and polylactic acid.

(13) The resin composition according to any one of (10) to (12), in which
the resin composition further includes a natural organic substance of 3.0% or more and 25.0% or less by mass, relative to the composition, and the natural organic substance is one or more substances selected from the group consisting of cellulose powder, wooden powder, starch, rice husk, soy pulp, and bran.

(14) The resin composition according to any one of (10) to (13), in which an average particle diameter of the heavy calcium carbonate is 0.7 μm or more and 6.0 μm or less.

(15) A molded article obtained from the resin composition according to any one of (10) to (14).

(16) The molded article according to (15), in which the molded article is an inflation-molded article.

(17) The molded article according to (15), in which the molded article is an extrusion-molded article.

Advantageous Effects of Invention

According to the present invention, a composition containing a biologically degradable resin capable of producing a molded article having suppressed deterioration of the tensile strength and the elongation at the breaking point thereof can be provided.

DESCRIPTION OF EMBODIMENTS

Hereinafter, embodiments of the present invention will be explained; but the present invention is not limited to these.

<Resin Composition>

The resin composition according to the present invention includes a biologically degradable resin and a heavy calcium carbonate with the mass ratio thereof in the range of 10:90 to 70:30, and the biologically degradable resin includes at least polybutylene adipate terephthalate or polybutylene succinate adipate.

The polybutylene adipate terephthalate (PBAT) and the polybutylene succinate adipate (PBSA) have favorable biological degradability.

According to the biologically degradable resin composition that is blended with calcium carbonate together with the biologically degradable resin like these, it has been known that favorable characteristics (such as a tearing property) can be given to a molded article obtained from the composition.

However, the inventor of the present invention has found that when the content of calcium carbonate in the biologically degradable resin composition is high, the tensile strength and the elongation at the breaking point of the molded article obtained from the composition are prone to be deteriorated.

Accordingly, the inventor of the present invention has further carried out an investigation, and as a result, it has been surprisingly found that by selecting a heavy calcium carbonate as the calcium carbonate, the deterioration in the tensile strength and the elongation at the breaking point as described above can be suppressed.

In addition, the inventor of the present invention has found that the suppression effect as mentioned above can be further enhanced by controlling the average particle diameter of the heavy calcium carbonate or by blending a prescribed plasticizer or a prescribed natural organic substance (these will be described later) together with the heavy calcium carbonate.

It is a very surprising finding that the deterioration in the tensile strength and the elongation at the breaking point thereof can be suppressed by combining these specific components in the way as described above, although the reason for this is not clear.

In the present invention, "biologically degradable", or "biological degradability" means the property of degradation by action of a microorganism or hydrolysis; and this can be evaluated by the method described in Examples.

In the present invention, "tensile strength" means, when a subject is broken by applying a tensile load to the subject, the value obtained by dividing a maximum load applied until this breaking point by a cross-sectional area of the subject before applying the tensile load; and this can be evaluated by the method described in Examples.

In the present invention, "elongation at the breaking point" means the elongation at the breaking point when a subject is broken by applying a tensile load thereof; and this can be evaluated by the method described in Examples.

In the present invention, "deterioration in the tensile strength and the elongation at the breaking point are suppressed" means, for example, the tensile strength and the elongation at the breaking point of a molded article obtained from the resin composition satisfying the elements of the present invention are greater than the tensile strength and the elongation at the breaking point of a molded article obtained from the resin composition unsatisfying the elements of the present invention except that the kind and the blending amount of the biologically degradable resin are the same.

Hereinafter, the composition of the resin composition according to the present invention will be explained.

(Kind of Biologically Degradable Resin)

The biologically degradable resin composition according to the present invention includes at least polybutylene adipate terephthalate (hereinafter, this is also called "PBAT") or polybutylene succinate adipate (hereinafter, this is also called "PBSA"). Namely, the biologically degradable resin composition according to the present invention may include only any one of PBAT and PBSA, or both of them.

The biologically degradable resin composition according to the present invention may or may not include a biologically degradable resin other than PBAT and PBSA.

Illustrative examples of the biologically degradable resin that can be included in the resin composition according to the present invention other than PBAT and PBSA include polylactic acid, polyhydroxy butyrate, poly(3-hydroxybutyrate-co-3-hydroxyhexanoate), polycaprolactone, polybutylene succinate, polyethylene succinate, polymaleic acid, polyglycolic acid, polydioxanone, and poly(2-oxetanone). Among these, from a viewpoint to readily express the advantageous effects of the present invention, polylactic acid is preferable.

In the present invention, "polylactic acid" includes a polylactic acid homopolymer that is obtained by polycondensation of only a lactic acid component as the raw material monomer thereof and a polylactic acid copolymer that is obtained by polycondensation of a lactic acid component and another monomer component, which is copolymerizable with the lactic acid component, as the raw material monomers thereof.

In the present invention, an arbitrary polymer that is known as the polylactic acid can be used.

There is no particular restriction in the other monomer component that is copolymerizable with lactic acid. Illustrative examples thereof include an oxyacid, a divalent alcohol, a polyvalent alcohol equal to or higher than a trivalent alcohol, an aromatic hydroxy compound, a divalent carboxylic acid, a polyvalent carboxylic acid equal to or higher than a trivalent carboxylic acid, and a lactone.

Illustrative examples of the oxyacid include glycolic acid, hydroxypropionic acid, hydroxybutyric acid, hydroxyvaleric acid, hydroxypentanoic acid, hydroxycaproic acid, hydroxybenzoic acid, and hydroxyheptanoic acid.

Illustrative examples of the divalent alcohol include ethyleneglycol, propyleneglycol, propanediol, butanediol, heptanediol, hexanediol, octanediol, nonanediol, decanediol, 1,4-cyclohexane dimethanol, neopentylglycol, diethyleneglycol, triethyleneglycol, polyethyleneglycol, and polytetramethylene glycol.

Illustrative examples of the polyvalent alcohol equal to or higher than a trivalent alcohol include glycerin, trimethylolpropane, and pentaerythritol.

Illustrative examples of the aromatic hydroxy compound include hydroquinone, resorcin, and bisphenol A.

Illustrative examples of the divalent carboxylic acid include oxalic acid, succinic acid, adipic acid, sebacic acid, azelaic acid, dodecanedioic acid, malonic acid, glutaric acid, cyclohexane dicarboxylic acid, terephthalic acid, isophthalic acid, phthalic acid, naphthalene dicarboxylic acid, bis(4-carboxyphenyl)methane, anthracene dicarboxylic acid, bis (4-carboxyphenyl) ether, and sodium 5-sulfoisophthalate.

Illustrative examples of the polyvalent carboxylic acid equal to or higher than a trivalent carboxylic acid include trimellitic acid and pyromellitic acid.

Illustrative examples of the lactone include caprolactone, valerolactone, propiolactone, undecalactone, and 1,5-oxepan-2-one.

(Composition of Biologically Degradable Resin)

There is no particular restriction in the composition of the biologically degradable resin so far as the composition includes at least PBAT or PBSA, although any one of the embodiments described below is especially preferable.

(Embodiment 1) The biologically degradable resin is composed of PBAT.

(Embodiment 2) The biologically degradable resin is composed of PBSA.

(Embodiment 3) The biologically degradable resin is composed of PBAT and PBSA.

(Embodiment 4) The biologically degradable resin is composed of PBAT and/or PBSA, and polylactic acid.

In the present invention, "the biologically degradable resin is composed of the resin X" means that the biologically degradable resin in the resin composition includes only the resin X.

In (Embodiment 3), although there is no particular restriction in the blending ratio of PBAT and PBSA, the mass ratio of PBAT to PBSA is preferably PBAT:PBSA=10:90 to 90:10.

In (Embodiment 4), although there is no particular restriction in the blending ratio of PBAT and PBSA to polylactic acid, the mass ratio of PBAT and PBSA (total mass) to polylactic acid is preferably PBAT and PBSA:polylactic acid=50:50 to 90:10.

In (Embodiment 4), although there is no particular restriction in the blending ratio of PBAT and polylactic acid, the mass ratio of PBAT to polylactic acid is preferably PBAT: polylactic acid=50:50 to 90:10.

In (Embodiment 4), although there is no particular restriction in the blending ratio of PBSA and polylactic acid, the mass ratio of PBSA to polylactic acid is preferably PBSA: polylactic acid=50:50 to 90:10.

From a viewpoint to readily express the advantageous effects of the present invention, the lower limit of the total mass of PBAT and/or PBSA in the biologically degradable resin is preferably 70% or more by mass, and more preferably 75% or more by mass, relative to the biologically degradable resin.

Although the upper limit of the total mass of PBAT and/or PBSA relative in the biologically degradable resin is not particularly restricted, this is preferably 90% or less by mass, and more preferably 80% or less by mass, relative to the biologically degradable resin.

(Heavy Calcium Carbonate)

In the present invention, "heavy calcium carbonate" is the one that is obtained, for example, by mechanically pulverizing a natural calcium carbonate, and is clearly distinguished from a synthetic calcium carbonate (namely, a light calcium carbonate) that is produced by a chemical precipitation reaction and the like.

The heavy calcium carbonate can be obtained, for example, by pulverizing natural calcium carbonates such as calcite (lime stone, chalk, marble, and the like), shell, and coral, followed by classifying the powders thereby obtained.

The pulverizing method in the production method of the heavy calcium carbonate may be any one of a wet pulverizing method and a dry pulverizing method. From an economical viewpoint, a dry pulverizing method, which does not require a dehydration process, a drying process, and the like is preferable.

There is no particular restriction in the pulverizer to be used for pulverizing. Illustrative examples thereof include an impact type pulverizer, a pulverizer using a pulverizing medium (such as a ball mill), and a roller mill.

With regard to the classification method in the production method of the heavy calcium carbonate, a conventionally known method such as an air classification, a wet type cyclone, and a decanter may be used.

The heavy calcium carbonate may be or may not be surface-treated. The surface treatment thereof may be carried out at an arbitrary point of time in the production method of the heavy calcium carbonate (before pulverizing, during pulverizing, before classification, after classification, or the like).

Illustrative examples of the surface treatment method of the heavy calcium carbonate include a physical method (plasma treatment and the like) and a chemical method (methods using a coupling agent, a surfactant, and the like).

In the surface treatment of the heavy calcium carbonate, illustrative examples of the coupling agent that is used in the chemical method include a silane coupling agent and a titanium coupling agent.

In the surface treatment of the heavy calcium carbonate, illustrative examples of the surfactant that is used in the chemical method include an anionic surfactant, a cationic surfactant, a nonionic surfactant, and an amphoteric surfactant. More specifically, illustrative examples thereof include a higher aliphatic acid, a higher aliphatic acid ester, a higher aliphatic acid amide, and a higher aliphatic acid salt.

By carrying out the surface treatment as described above, dispersibility and the like of the heavy calcium carbonate can be enhanced.

Note that the heavy calcium carbonate not having been surface-treated is preferable in the point that the risk of generating an unpleasant odor due to thermal decomposition or the like of a surface treating agent during molding can be lowered.

There is no particular restriction in the morphology of the heavy calcium carbonate. From a viewpoint of dispersibility in the resin composition, the morphology thereof is preferably particle-like.

When the heavy calcium carbonate is particle-like, the average particle diameter thereof is preferably 0.7 μm or more and 6.0 μm or less, and more preferably 1.0 μm or more and 5.0 μm or less, while still more preferably 1.5 μm or more and 3.0 μm or less.

When the average particle diameter of the heavy calcium carbonate is within the above-mentioned range, the dispersibility thereof in the resin composition is excellent, and an excessive increase in the viscosity of the resin composition can be avoided. In addition, protruding deletion of the heavy calcium carbonate from the surface of the molded article obtained from the resin composition, as well as deterioration of the surface properties, the mechanical strength, and the like can be suppressed, so that the advantageous effects of the present invention can be expressed more readily.

In the present invention, "average particle diameter" means the value calculated from the measurement result of the specific surface area obtained by the air permeation method in accordance with JIS M-8511.

As for the measurement instrument of the average particle diameter, for example, the specific surface area measurement instrument "SS-100 Type" manufactured by Shimadzu Corp. may be preferably used.

When the heavy calcium carbonate is particle-like, it is preferable that the particle whose particle diameter is 45 μm or more be not included in the particle diameter distribution thereof.

When the heavy calcium carbonate is particle-like, the formlessness thereof can be expressed by the sphericity of the shape thereof, namely by the circularity. When the circularity is lower, this means the formlessness is higher.

When the heavy calcium carbonate is particle-like, the circularity thereof is preferably 0.50 or more and 0.95 or less, and more preferably 0.55 or more and 0.93 or less, while still more preferably 0.60 or more and 0.90 or less.

In the present invention, "circularity" means the value obtained by dividing the particle's projected area divided with the area of the circle having the same circumferential length as the particle's projected circumferential length ((particle's projected area)/(area of the circle having the same circumferential length as the particle's projected circumferential length)).

There is no particular restriction in the measurement method of the circularity; for example, the circularity can be identified by analyzing the particle's projected figure obtained by a scanning microscope, a stereomicroscope, or the like, by using a commercially available image analysis software.

Specifically, the circularity can be calculated by the following formula on the basis of the measurement results of the projected particle's area (A), the area (B) of the circle having the same circumferential length as the particle's projected circumferential length, the radius (r) of the circle having the same circumferential length as the particle's projected circumferential length, and the particle's projected circumferential length (PM).

$$\text{"Circularity"} = A/B = A/\pi r^2 = A \times 4\pi/(PM)^2$$

(Composition of the Resin Composition)

There is no particular restriction in the composition of the resin composition according to the present invention except that the mass ratio of the biologically degradable resin to the heavy calcium carbonate is biologically degradable resin:heavy calcium carbonate=10:90 to 70:30.

According to the present invention, even when the content of the heavy calcium carbonate in the resin composition is large as described above, the tensile strength and the elongation at the breaking point of the molded article obtained from the resin composition are not prone to be deteriorated.

In the resin composition according to the present invention, the mass ratio of the biologically degradable rein to the heavy calcium carbonate is preferably biologically degradable resin:heavy calcium carbonate=30:70 to 70:30, and more preferably in the range of 50:50 to 70:30.

The upper limit of the content of the biologically degradable resin relative to the resin composition is preferably 70% or less by mass, and more preferably 60% or less by mass.

The lower limit of the content of the biologically degradable resin relative to the resin composition is preferably 10% or more by mass, and more preferably 20% or more by mass.

The upper limit of the content of the heavy calcium carbonate relative to the resin composition is preferably 90% or less by mass, and more preferably 80% or less by mass.

The lower limit of the content of the heavy calcium carbonate relative to the resin composition is preferably 30% or more by mass, and more preferably 40% or more by mass.

(Other Components in the Resin Composition)

The resin composition according to the present invention may further include an arbitrary component in addition to the components described above so far as the addition thereof does not impair the advantageous effects of the present invention. These components may be used singly or as a combination of two or more of them. The kind and the blending amount of these components can be determined as appropriate in view of the effect or the like to be obtained.

Illustrative examples of the component that is possibly included in the resin composition according to the present invention include a plasticizer, a natural organic substance, a resin other than the biologically degradable resins, a filler (other than the heavy calcium carbonate), a colorant, a lubricant, an antioxidant, a flame retardant, and a foaming agent.

[Plasticizer]

Illustrative examples of the plasticizer include acetyl tributyl citrate, triethyl citrate, acetyl triethyl citrate, dibutyl phthalate, diallyl phthalate, dimethyl phthalate, diethyl phthalate, di-2-methoxyethyl phthalate, dibutyl tartrate, an o-benzoylbenzoic acid ester, diacetylene, and an epoxidized soy-bean oil.

As a result of the research by the inventor of the present invention, in the combination with the heavy calcium carbonate, it has been surprisingly found that, among the plasticizers described above, acetyl tributyl citrate can readily suppress deterioration of especially the tensile strength and the elongation at the breaking point of the molded article of the resin composition without impairing the biological degradability of the biologically degradable resin.

The upper limit of the content of the plasticizer relative to the resin composition according to the present invention is preferably 20.0% or less by mass, and more preferably 15.0% or less by mass.

The lower limit of the content of the plasticizer relative to the resin composition according to the present invention is preferably 5.0% or more by mass, and more preferably 7.5% or more by mass.

When acetyl tributyl citrate is used as the plasticizer, the upper limit of the content thereof relative to the resin composition according to the present invention is preferably 20.0% or less by mass, and more preferably 15.0% or less by mass.

When acetyl tributyl citrate is used as the plasticizer, the lower limit of the content thereof relative to the resin composition according to the present invention is preferably 5.0% or more by mass, and more preferably 7.5% or more by mass.

[Natural Organic Substance]

As for the natural organic substance, any arbitrary component that can be blended to the resin composition may be used.

As a result of the research by the inventor of the present invention, in the combination with the heavy calcium carbonate, it has been surprisingly found that, among natural organic substances, one or more substances selected from the group consisting of cellulose powder, wooden powder, starch, rice husk, soy pulp, and bran can readily suppress deterioration of especially the tensile strength and the elongation at the breaking point of the molded article of the resin composition without impairing the biological degradability of the biologically degradable resin.

In the present invention, there is no particular restriction in the "cellulose powder" so far as this is the powder-like cellulose.

The average particle diameter of the cellulose powder is preferably 5 μm or more and 45 μm or less, and more preferably 10 μm or more and 30 μm or less.

Here, a commercially available cellulose powder may be used.

In the present invention, there is no particular restriction in the "wooden powder" so far as this is the powder obtained from an arbitrary tree (cypress, cedar, and the like).

The average particle diameter of the wooden powder is preferably 20 μm or more and 300 μm or less, and more preferably 20 μm or more and 45 μm or less.

For example, the powder known as sawdust may be used as the wooden powder.

In the present invention, "starch" in arbitrary morphology that can be blended with the resin may be used. The starch may be, for example, powder-like.

In the present invention, "rice husk" means the outermost skin of the unhulled rice. The rice husk in arbitrary morphology that can be blended with the resin may be used. The rice husk may be, for example, powder-like.

In the present invention, "soy pulp" means the strained lees of a soy milk. The soy pulp in arbitrary morphology that can be blended with the resin may be used. The soy pulp is preferably in the dried form, and more preferably in the form of a dried powder.

In the present invention, "bran" means a skin (outer skin portion, embryo, and the like) that is removed during milling of wheat. The bran in arbitrary morphology that can be blended with the resin may be used. The gran may be, for example, powder-like.

The upper limit of the content (total amount) of the natural organic substance relative to the resin composition is preferably 25.0% or less by mass, and more preferably 10.0% or less by mass.

The lower limit of the content (total amount) of the natural organic substance relative to the resin composition is preferably 3.0% or more by mass, and more preferably 5.0% or more by mass.

[Others]

Hereinafter, illustrative examples of the other component that can be included in the resin composition according to the present invention will be described.

Illustrative examples of the resin other than the biologically degradable resin include:

polyolefin type resins such as a polyethylene type resin, a polypropylene type resin, a polymethyl-1-pentene, and an ethylene-cyclic olefin copolymer;

polyolefin type resins having a functional group such as an ethylene-vinyl acetate copolymer, an ethylene-acrylic acid copolymer, an ethylene-methacrylic acid copolymer, a metal salt of an ethylene-methacrylic acid copolymer (ionomer), an ethylene-alkyl acrylate ester copolymer, an ethylene-alkyl methacrylate ester copolymer, a polyethylene modified by maleic acid, and a polypropylene modified by maleic acid;

polyamide type resins such as nylon-6, nylon-6,6, nylon-6,10, and nylon-6,12;

aromatic polyester type resins such as polyethylene terephthalate and a copolymer thereof, polyethylene naphthalate, and polybutylene terephthalate;

polystyrene type resins such as an atactic polystyrene, a syndiotactic polystyrene, an acrylonitrile-styrene (AS) copolymer, and an acrylonitrile-butadiene-styrene (ABS) copolymer;

polyvinyl chloride type resins such as polyvinyl chloride and polyvinylidene chloride;

polyphenylene sulfide; and polyether type resins such as a polyether sulfone, a polyether ketone, and a polyether ether ketone.

Note that, from a viewpoint to readily express the advantageous effects of the present invention, it is preferable that the resin composition according to the present invention do not include the resin or include only a little of the resin other than the biologically degradable resin, if any (for example, 1.0% or less by mass relative to the resin composition).

As for the filler, any filler, a synthesized filler or a filler originated from a natural mineral, may be used.

Illustrated examples of the filler include carbonate salts of calcium, magnesium, aluminum, titanium, iron, zinc, and the like (except for the heavy calcium carbonate), as well as the salts of these minerals such as sulfate, silicate, phosphate, borate, and oxides, and hydrates of these salts and oxides.

More specifically, illustrative examples thereof include light calcium carbonate, magnesium carbonate, zinc oxide, titanium oxide, silica, alumina, clay, talc, kaolin, aluminum hydroxide, magnesium hydroxide, aluminum silicate, magnesium silicate, calcium silicate, aluminum sulfate, magnesium sulfate, calcium sulfate, magnesium phosphate, barium sulfate, silica sand, carbon black, zeolite, molybdenum, diatomaceous earth, sericite, shirasu, calcium sulfite, sodium sulfate, potassium titanate, bentonite, wollastonite, and graphite.

Note that, from a viewpoint to readily express the advantageous effects of the present invention, it is preferable that the resin composition according to the present invention do not include the filler or include only a little of the filler other than the heavy calcium carbonate, if any (for example, 0.1% or less by mass relative to the resin composition).

As for the colorant, any colorant that has been conventionally known may be used regardless of an organic pigment, an inorganic pigment or a dye.

Illustrative examples of the organic pigment include pigments of an azo type, an anthraquinone type, a phthalocyanine type, a quinacridone type, an isoindolinone type, a dioxazine type, a perinone type, a quinophthalone type, and a perylene type.

Illustrative examples of the inorganic pigment include ultramarine, titanium oxide, titanium yellow, iron oxide (Bengala), chromium oxide, zinc oxide, and carbon black.

Illustrative examples of the lubricant include aliphatic acid type lubricants (stearic acid, hydroxystearic acid, a composite type stearic acid, oleic acid, and the like), aliphatic alcohol type lubricants, aliphatic amide type lubricants (stearamide, oxystearamide, oleamide, erucamide, ricinoleamide, behenamide, methylolamide, methylene bisstearamide, methylene bisstearobehenamide, a bisamide acid of a higher aliphatic acid, a composite type amide, and the like), aliphatic acid ester type lubricants (n-butyl stearate, methyl hydroxystearate, an aliphatic acid ester of a polyvalent alcohol, a saturated aliphatic acid ester, an ester type wax, and the like), and an aliphatic acid metal soap type lubricant.

Illustrative examples of the antioxidant include a phosphorous type antioxidant, a phenol type antioxidant, and a pentaerythritol type antioxidant.

Illustrative examples of the flame retardant include a halogen type flame retardant, a phosphorous type flame retardant, and a non-phosphorous, non-halogen type flame retardant such as a metal hydrate.

Illustrative examples of the foaming agent include aliphatic hydrocarbons (propane, butane, pentane, hexane, heptane, and the like), alicyclic hydrocarbons (cyclobutane, cyclopentane, cyclohexane, and the like), halogenated hydrocarbons (chlorodifluoromethane, difluoromethane, trifluoromethane, trichlorofluoromethane, dichloromethane, dichlorofluoromethane, dichlorodifluoromethane, chloromethane, chloroethane, dichlorotrifluoroethane, dichloropentafluoroethane, tetrafluoroethane, difluoroethane, pentafluoroethane, trifluoroethane, dichlorotetrafluoroethane, trichlorotrifluoroethane, tetrachlorodifluoroethane, perfluorocyclobutane, and the like), inorganic gases (carbon dioxide, nitrogen, air, and the like), and water.

(Preferable Composition of the Resin Composition)

Preferable embodiment of the resin composition according to the present invention may include, for example, PBAT and/or PBSA in the range of 55 to 65% by mass, the heavy calcium carbonate in the range of 25 to 35% by mass, and the acetyl tributyl citrate in the range of 5 to 15% by mass, relative to the resin composition.

<Production Method of the Resin Composition>

The resin composition according to the present invention may be produced by using the components described above with the methods for producing resin compositions that have been conventionally known.

The resin composition may be produced, for example, by way of mixing and melt kneading of the components.

The timing of mixing and melt kneading may be determined as appropriate with considering the molding method to be used (extrusion molding, injection molding, vacuum molding, and the like). For example, mixing may be carried out before charging the components from the hopper of a molding machine, or at the same time with molding.

Melt kneading may be carried out, for example, by using a biaxial kneader.

The resin composition according to the present invention may be, for example, in the form of pellets having arbitrary size and shape.

There is no particular restriction in the shape of the pellet. This may be pillar-like, spherical, oval-ball-like, or the like.

There is no particular restriction in the size of the pellet. For example, in the case where the pellet is in the spherical shape, the diameter thereof may be 1 to 10 mm. In the case where the pellet is in the oval ball shape, the aspect ratio thereof is 0.1 to 1.0 with the vertical and horizontal lengths of 1 to 10 mm. In the case where the pellet is in the pillar shape, the diameter thereof may be 1 to 10 mm and the length of 1 to 10 mm.

By molding the resin composition according to the present invention after drying when necessary, a desired molded article can be obtained.

<Molded Article>

The molded article according to the present invention may be obtained by molding the resin composition according to the present invention by means of an arbitrary molding method.

The molded article according to the present invention may have an arbitrary shape in accordance with the use thereof and the like.

The molded article according to the present invention may be, for example, a film, a sheet, a container (food container and the like), daily goods (various disposable products and the like), automobile parts, electric and electronic parts, and various consumables (those in the field such as a construction member).

The resin composition according to the present invention is excellent in the mechanical characteristics; so, this is especially suitable for an inflation molding or for an extrusion molding. Accordingly, the molded article according to the present invention is preferably an inflation-molded article or an extrusion-molded article.

Illustrative examples of the inflation-molded article include a film, a sheet, and a bag (plastic shopping bag, or the like).

Although the film thickness of the inflation-molded article is not particularly restricted, this is preferably 10 μm to 200 μm, and more preferably 30 μm to 100 μm.

Illustrative examples of the extrusion-molded article include a film, a sheet, and a hollow product.

<Production Method of the Molded Article>

The production method of the molded article according to the present invention may be chosen as appropriate in accordance with the molded article to be obtained.

Illustrative examples of the production method of the molded article according to the present invention include an inflation molding method, an extrusion molding method, an injection molding method, a foaming injection molding method, an injection-compression molding method, a blow molding method, a press molding method, a calendar molding method, and a vacuum molding method.

Molding condition may be determined as appropriate with considering the composition of the resin composition, the kind of the molded article, and the like.

In the case where the molded article is a film, a sheet, or the like, this may be or is not necessarily stretched monoaxially, biaxially, or multi-axially, during or after the molding thereof.

EXAMPLES

Hereinafter, the present invention will be explained in more detail by Examples; but the present invention is not limited to these Examples.

<Preparation of the Resin Composition>

The resin compositions including the components listed in Tables 1 to 4 were prepared. Note that the units of the values in the compositions in Tables are "% by mass".

Details of the components in the resin compositions are as follows. Hereinafter, "average particle diameter" is the value calculated from the measurement result of the specific surface area obtained by the air permeation method in accordance with JIS M-8511 by using the specific surface area measurement instrument "SS-100 Type" manufactured by Shimadzu Corp.

(Biologically Degradable Resin)

Biologically degradable resin 1: this is composed of 70% by mass of polybutylene adipate terephthalate and 30% by mass of polylactic acid.

Biologically degradable resin 2: this is composed of 70% by mass of polybutylene succinate adipate and 30% by mass of polylactic acid.

(Calcium Carbonate)

Calcium carbonate 1: heavy calcium carbonate particle (average particle diameter: 2.2 μm, surface untreated).

Calcium carbonate 2: heavy calcium carbonate particle (average particle diameter: 7.2 μm, surface untreated).

Calcium carbonate 3: heavy calcium carbonate particle (average particle diameter: 1.5 μm, surface untreated).
(Plasticizer)
Plasticizer 1: acetyl tributyl citrate.
Plasticizer 2: triethyl citrate.
(Natural Organic Substance)
Cellulose powder: average particle diameter of 20 μm.
Wooden powder: average particle diameter of 30 μm, originated from cypress.
Starch: powder-like.
Rice hulk: powder-like.
Soy pulp: dried powder-like.
Bran: powder-like
<Preparation of Inflation-molded Article>
A film was prepared as the inflation-molded article.
Specifically, by using an inflation film extrusion line (60 mm of circular die, 1.2 mm of die gap, 30 mm of screw diameter, L/D ratio=30), a film having the thickness of 30 μm was prepared. The film was processed with BUR (blow up ratio) of 2.5.
In the extruding machine, the temperature in each section was set at 180 to 200° C., and the rotation number was kept at 20 rpm.
<Evaluation of the Film>
The tensile strength, the elongation at the breaking point, and the biological degradability of the film thus obtained were evaluated by the methods described below. The results thereof are summarized in Tables 1 to 4.
(Tensile Strength and Elongation at the Breaking Point)
From each film, the test piece of dumbbell No. 3 in accordance with JIS K6251:2017 was obtained.
The tensile test of the test piece thereby obtained was conducted at 23° C. by using Strograph (manufactured by Toyo Seiki Seisaku-sho, Ltd.). The stretching speed was set at 100 mm/minute.

From the stress-strain curve thereby obtained, the tensile strength (unit: MPa) and the elongation at the breaking point (unit: %) were measured; and the evaluation thereof was conducted with the standard described below.
When the tensile strength and the elongation at the breaking point are greater, this means that the tensile strength and the elongation at the breaking point are better.
[Evaluation Standard of Tensile Strength]
A: The tensile strength is 25 Mpa or more.
B: The tensile strength is 15 MPa or greater and less than 25 MPa.
C: The tensile strength is 5 MPa or greater and less than 15 MPa.
D: The tensile strength is less than 5 MPa.
[Evaluation Standard of Elongation at the Breaking Point]
A: The elongation at the breaking point is 250% or more.
B: The elongation at the breaking point is 150% or greater and less than 250%.
C: The elongation at the breaking point is 50% or greater and less than 150%.
D: The elongation at the breaking point is less than 50%.
(Biological Degradability)
From each film, a test piece having the size with the vertical length of 30 mm and the horizontal length of 30 mm was obtained.
The test piece thereby obtained was allowed to stand in a 25-mL vial containing sea water (10 mL) with the temperature controlled at about room temperature (25±5° C.) for 1 month.
Then, the state of the test piece was visually observed; and the evaluation thereof was conducted in accordance with the standard described below.
[Evaluation Standard of Biological Degradability]
A: The test piece is decomposed almost completely.
B: The test piece is either partially decomposed or there is no change observed in the test piece.

TABLE 1

|  | Comparative Example 1-1 | Example 1-1 | Example 1-2 | Example 1-3 | Comparative Example 1-2 | Comparative Example 1-3 | Example 1-4 | Example 1-5 |
|---|---|---|---|---|---|---|---|---|
| Biologically degradable resin 1 | 100 | 10 | 10 | 10 | 10 | 10 | 60 | 60 |
| Calcium carbonate 1 |  | 90 | 85 | 85 |  |  | 40 | 30 |
| Calcium carbonate 3 |  |  |  |  | 90 | 85 |  |  |
| Plasticizer 1 |  |  | 5 |  |  | 5 |  | 10 |
| Plasticizer 2 |  |  |  | 5 |  |  |  |  |
| Tensile strength | D | B | A | B | C | C | B | A |
| Elongation at breaking point | D | B | A | B | C | C | B | A |
| Biological degradability | A | A | A | A | A | A | A | A |

|  | Example 1-6 | Comparative Example 1-4 | Comparative Example 1-5 | Example 1-7 | Example 1-8 | Example 1-9 | Comparative Example 1-6 | Comparative Example 1-7 |
|---|---|---|---|---|---|---|---|---|
| Biologically degradable resin 1 | 60 | 60 | 60 | 70 | 70 | 70 | 70 | 70 |
| Calcium carbonate 1 | 30 |  |  | 30 | 20 | 20 |  |  |
| Calcium carbonate 3 |  | 40 | 30 |  |  |  | 30 | 20 |
| Plasticizer 1 |  |  | 10 |  | 10 |  |  | 10 |
| Plasticizer 2 | 10 |  |  |  |  | 10 |  |  |
| Tensile strength | B | C | C | B | A | B | C | C |
| Elongation at breaking point | B | C | C | B | A | B | C | C |
| Biological degradability | A | A | A | A | A | A | A | A |

TABLE 2

| | Comparative Example 2-1 | Example 2-1 | Example 2-2 | Example 2-3 | Comparative Example 2-2 | Comparative Example 2-3 | Example 2-4 | Example 2-5 |
|---|---|---|---|---|---|---|---|---|
| Biologically degradable resin 2 | 100 | 10 | 10 | 10 | 10 | 10 | 60 | 60 |
| Calcium carbonate 3 | | 90 | 85 | 85 | | | 40 | 30 |
| Calcium carbonate 1 | | | | | 90 | 85 | | |
| Plasticizer 1 | | | 5 | | | 5 | | |
| Plasticizer 2 | | | | 5 | | | | 10 |
| Tensile strength | D | B | A | B | C | C | B | A |
| Elongation at breaking point | D | B | A | B | C | C | B | A |
| Biological degradability | A | A | A | A | A | A | A | A |

| | Example 2-6 | Comparative Example 2-4 | Comparative Example 2-5 | Example 2-7 | Example 2-8 | Example 2-9 | Comparative Example 2-6 | Comparative Example 2-7 |
|---|---|---|---|---|---|---|---|---|
| Biologically degradable resin 2 | 60 | 60 | 60 | 70 | 70 | 70 | 70 | 70 |
| Calcium carbonate 3 | 30 | | | 30 | 20 | 20 | | |
| Calcium carbonate 1 | | 40 | 30 | | | | 30 | 20 |
| Plasticizer 1 | | | 10 | | 10 | | | 10 |
| Plasticizer 2 | 10 | | | | | 10 | | |
| Tensile strength | B | C | C | B | A | B | C | C |
| Elongation at breaking point | B | C | C | B | A | B | C | C |
| Biological degradability | A | A | A | A | A | A | A | A |

TABLE 3

| | Example 3-1 | Example 3-2 | Example 3-3 | Example 3-4 | Example 3-5 | Example 3-6 | Example 3-7 | Example 3-8 |
|---|---|---|---|---|---|---|---|---|
| Biologically degradable resin 1 | 50 | 50 | 50 | 50 | 50 | 50 | 50 | 50 |
| Calcium carbonate 1 | 45 | | 40 | 40 | 40 | 40 | 40 | 40 |
| Calcium carbonate 2 | | 45 | | | | | | |
| Plasticizer 1 | 5 | 5 | | | | | | |
| Cellulose powder | | | 10 | | | | | |
| Wooden powder | | | | 10 | | | | |
| Starch | | | | | 10 | | | |
| Rice husk | | | | | | 10 | | |
| Soy pulp | | | | | | | 10 | |
| Bran | | | | | | | | 10 |
| Tensile strength | B | B | A | A | A | A | A | A |
| Elongation at breaking point | B | B | A | A | A | A | A | A |
| Biological degradability | A | A | A | A | A | A | A | A |

TABLE 4

| | Example 4-1 | Example 4-2 | Example 4-3 | Example 4-4 | Example 4-5 | Example 4-6 | Example 4-7 | Example 4-8 |
|---|---|---|---|---|---|---|---|---|
| Biologically degradable resin 2 | 50 | 50 | 50 | 50 | 50 | 50 | 50 | 50 |
| Calcium carbonate 1 | 45 | | 40 | 40 | 40 | 40 | 40 | 40 |
| Calcium carbonate 2 | | 45 | | | | | | |
| Plasticizer 1 | 5 | 5 | | | | | | |
| Cellulose powder | | | 10 | | | | | |
| Wooden powder | | | | 10 | | | | |
| Starch | | | | | 10 | | | |
| Rice husk | | | | | | 10 | | |
| Soy pulp | | | | | | | 10 | |
| Bran | | | | | | | | 10 |
| Tensile strength | B | B | A | A | A | A | A | A |
| Elongation at breaking point | B | B | A | A | A | A | A | A |

TABLE 4-continued

| | Example 4-1 | Example 4-2 | Example 4-3 | Example 4-4 | Example 4-5 | Example 4-6 | Example 4-7 | Example 4-8 |
|---|---|---|---|---|---|---|---|---|
| Biological degradability | A | A | A | A | A | A | A | A |

The invention claimed is:

1. A resin composition comprising:
   a biologically degradable resin;
   a heavy calcium carbonate; and
   acetyl tributyl citrate, wherein
   the resin composition having a mass ratio of the biologically degradable rein resin to the heavy calcium carbonate of 10:90 to 70:30,
   the biologically degradable resin including at least polybutylene adipate terephthalate or polybutylene succinate adipate,
   the biologically degradable resin having a polybutylene adipate terephthalate content of 70% by mass or more or having a polybutylene succinate adipate content of 70% by mass or more,
   the resin composition having an acetyl tributyl citrate content of 5.0% by mass or more and 20.0% by mass or less, and
   the resin composition is free of polyethylene glycol.

2. The resin composition according to claim 1, wherein the biologically degradable resin is composed of polybutylene adipate terephthalate and polylactic acid.

3. The resin composition according to claim 1, wherein the biologically degradable resin is composed of polybutylene succinate adipate and polylactic acid.

4. The resin composition according to claim 1, further comprising 3.0% by mass or more and 25.0% by mass or less of a natural organic substance,
   wherein the natural organic substance is one or more substances selected from the group consisting of cellulose powder, wooden powder, starch, rice husk, soy pulp, and bran.

5. The resin composition according to claim 1, wherein the heavy calcium carbonate has an average particle diameter of 0.7 µm or more and 6.0 µm or less.

6. A molded article obtained from the resin composition according to claim 1.

7. The molded article according to claim 6, being an inflation-molded article.

8. The molded article according to claim 6, being an extrusion-molded article.

* * * * *